May 31, 1949.  W. E. MARTIN  2,471,636
TRAILER CONNECTION
Filed July 30, 1945  5 Sheets-Sheet 1

INVENTOR
W. E. MARTIN
BY
Merrill M. Blackburn.
ATTORNEY

May 31, 1949.  W. E. MARTIN  2,471,636
TRAILER CONNECTION
Filed July 30, 1945  5 Sheets-Sheet 2

INVENTOR
W. E. MARTIN
BY
Merrill M. Blackburn
ATTORNEY

INVENTOR.
W. E. MARTIN
BY
Merrill M. Blackburn

INVENTOR.
W. E. MARTIN
BY
Merrill M. Blackburn

May 31, 1949. W. E. MARTIN 2,471,636
TRAILER CONNECTION
Filed July 30, 1945 5 Sheets-Sheet 5

INVENTOR.
W. E. MARTIN
BY
Merrill M. Blackburn

Patented May 31, 1949

2,471,636

UNITED STATES PATENT OFFICE 2,471,636

TRAILER CONNECTION

William E. Martin, Kewanee, Ill.

Application July 30, 1945, Serial No. 607,859

9 Claims. (Cl. 280—33.44)

My present invention relates to a structure for connecting a trailer unit to a traction unit, and more especially to a structure which can be attached to an ordinary truck, thus doing away with the necessity for having a traction unit which has no use except when connected to a trailer unit for transporting the same.

Among the objects of this invention are to provide a structure which can be attached to a traction unit useful for various purposes, to make the same useful in connecting a trailer unit to the traction unit; to provide an improved structure for the purpose indicated which will tend to cause a trailer to move in a path such that it will not cut corners undesirably, when making a turn; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, together with various modifications thereof, I desire the same to be understood as illustrative only and not to be interpreted in a limiting sense.

In the drawings annexed hereto and forming a part hereof,

Figure 4:
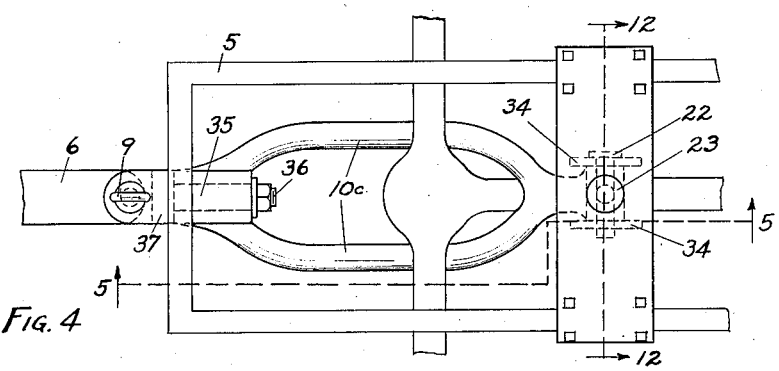
Figs. 4 and 5 are, respectively, plan and vertical section of a modified form of the structure shown in Figs. 1, 2, and 3.
Figure 6:
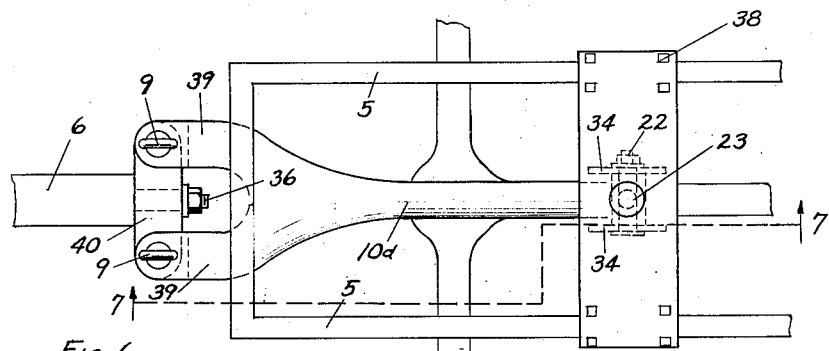
Figs. 6 and 7 are, respectively, plan and vertical section of another modification of this structure.
Figure 8:
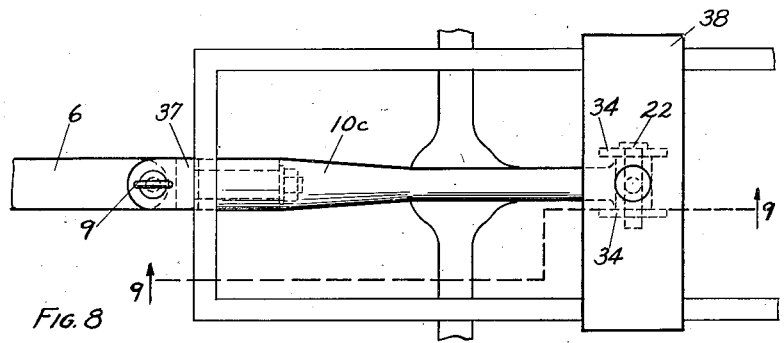
Figs. 8 and 9 are, respectively, plan and vertical section of another modificaton of this structure.
Figure 9:
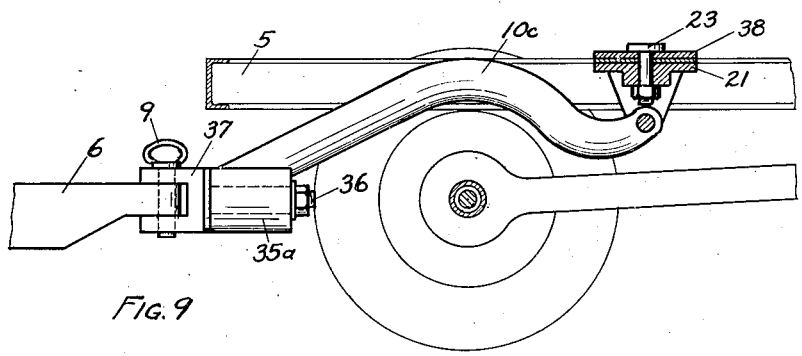
Figure 10:
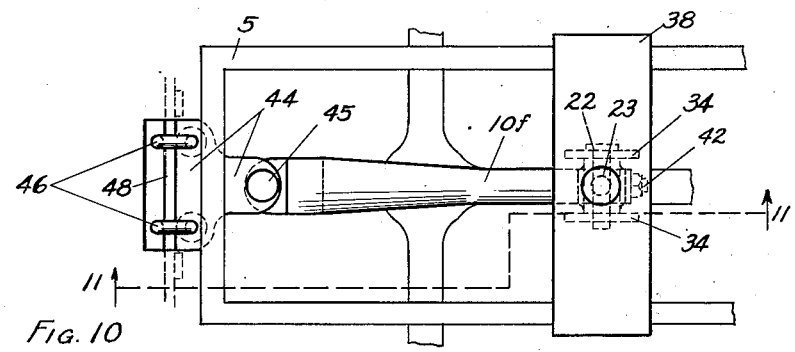
Figs. 10 and 11 are, respectively, plan and vertical section of a further modified form of this structure.
Figure 12:
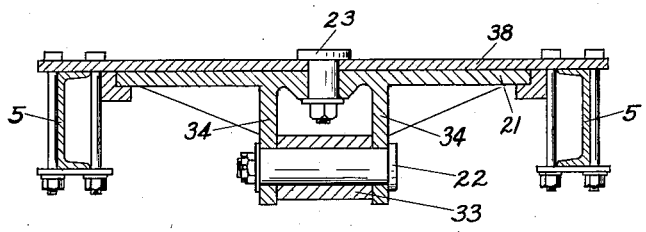
Figure 13:
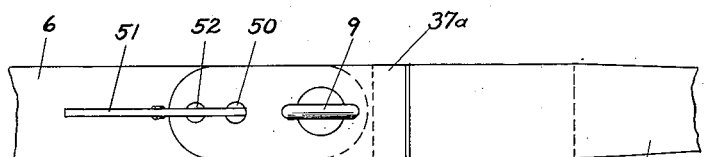
Figure 14:
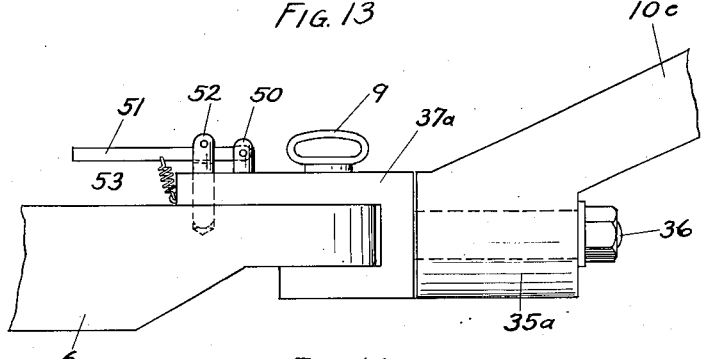

Fig. 12 represents a cross-section substantially along the plane indicated by the line 12—12, Fig. 4, or a corresponding plane in Figs. 6, 8, and 10; and Figs. 13 and 14 are, respectively, a fragmentary plan and side elevation of a modified form of a part of the structure shown in Figs. 8 and 9.

Figure 1:
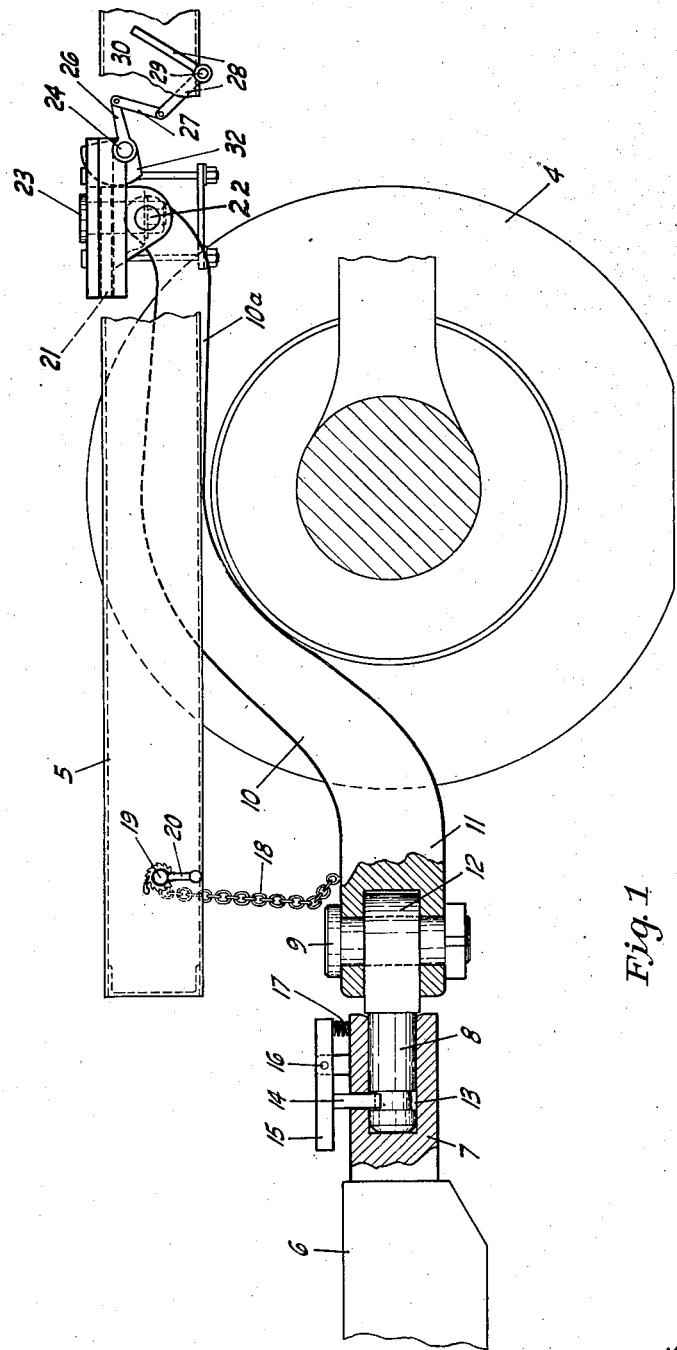
Fig. 1 represents a side view of my present invention, partly broken away, showing the same connecting a traction unit and a trailer.
Figure 2:
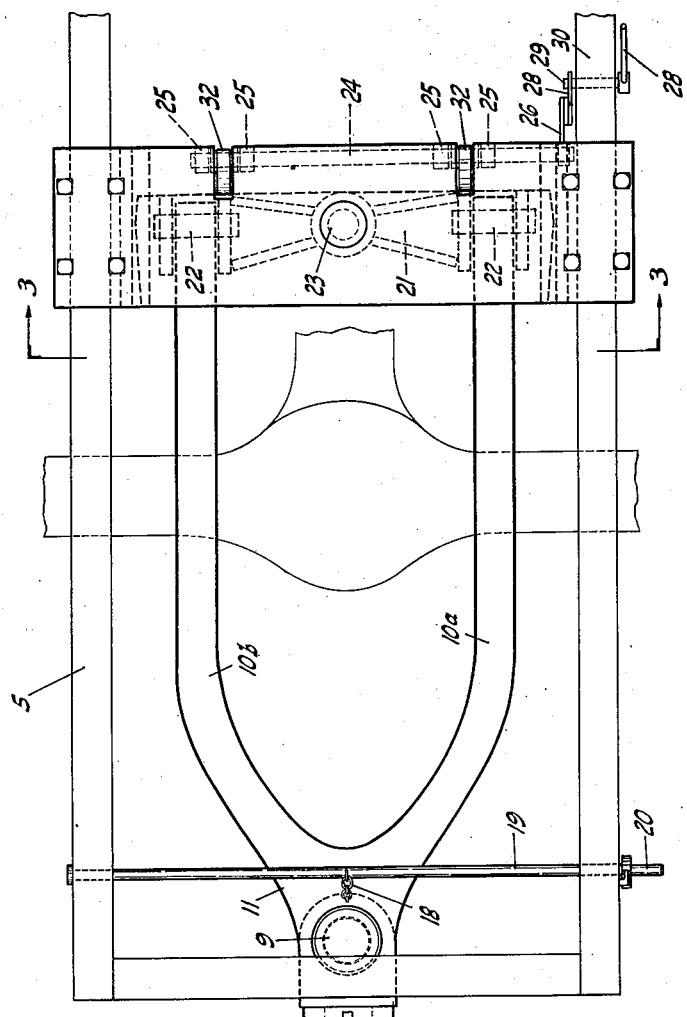
Fig. 2 represents a plan view of the structure shown in Fig. 1.
Figure 3:
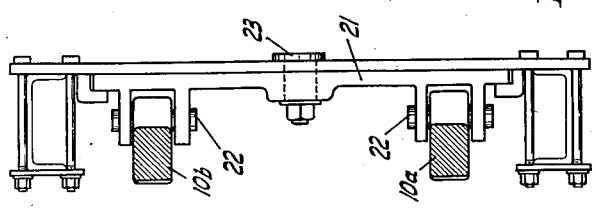
Fig. 3 represents a cross-section substantially along the plane indicated by the line 3—3, Fig. 2, looking in the direction of the arrowheads.

Reference will now be made in greater detail to the annexed drawings for a more complete description of this invention. In Figs. 1 and 2 of the drawings, the numeral 4 denotes the rear or traction wheels of a truck, the frame of which is indicated by the numeral 5. The forward end of a drawn or trailer unit is indicated at 6, and this is shown as having at its forward end a socket 7 for reception of a spindle 8, pivotally connected by the pivot member 9 to the rear end of the gooseneck 10 which is roughly in the form of a wishbone. As is clear from Fig. 1, the rear end 11 of the gooseneck is slotted for reception of the aperturered front end 12 of the spindle 8. The part 6 is referred to thereinafter as a "tongue" or "reach."

The spindle 8 has a groove 13 formed therein for reception of a connecting pin 14 projecting downwardly from the under face of the lever 15, pivoted at 16 and actuated by a spring 17 into holding position. A chain 18 connects the rear end portion of the truck frame with the rear portion of the gooseneck and thus prevents the gooseneck from dropping down on the rear axle and the differential housing of the traction unit. A shaft 19 extends across the truck frame, as is clear from Fig. 2, and has a crank 20 thereon by means of which it can be turned. When this shaft is turned by turning the crank 20, the chain 18 is wound up on the shaft and thus the rear end of the gooseneck may be lifted to get the spindle 8 into alignment with the socket 7 in the connecting means. Also, when the traction unit is disconnected from the trailer unit, the chain is used to suspend the gooseneck.

As is clear from Fig. 2, the gooseneck 10 is forked and therefore has two arms 10a and 10b which pass upwardly over the rear axle and differential housing of the truck, to be connected at their forward ends to the fifth wheel 21, mounted on the truck frame, and secured thereto. Pivots 22 permit vertical pivotal movement of the gooseneck with relation to the truck. The fifth wheel 21 is pivoted at 23 to the truck floor, as is clear from Fig. 2. However, if it is desired to lock this against such pivotal motion, this can be done by the mechanism about to be described.

The shaft 24 passes through eyes 25 under the truck platform and has a lever 26 connected thereto. This is connected by a link 27 to the bell crank 28 of which the shaft 29 forms a part. This shaft passes under the side frame member 30 of the truck, as is clear from Fig. 1. Cams 32 are carried by shaft 24 and are operated into locking or unlocking position by operation of the bell crank 28. If it is desired to lock the fifth wheel 21 against horizontal turning, this, as is clear, can be done by operating this bell crank which turns the locking cams 32 into engagement with the cooperating parts of the fifth wheel.

Figure 7:
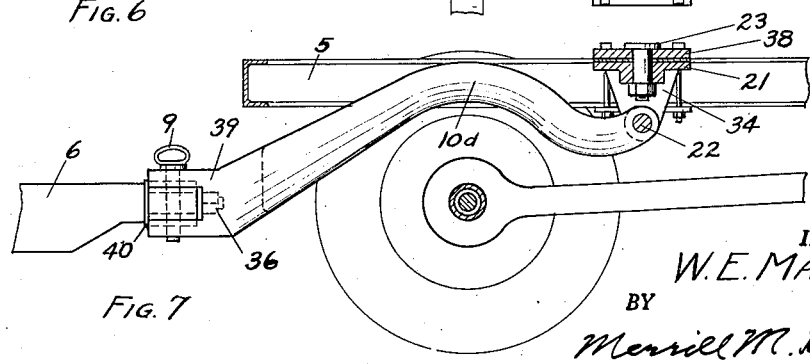

The structure shown at 24 to 29 and 32 in Figs. 1 and 2 has been omitted from the remaining figures but it will be understood that in a structure built in accordance with this invention such would be supplied, except in structures such as that of Figs. 6 and 7 which have only one pivot permitting horizontal swinging.

It is clear from the foregoing that, if the truck and trailer are equipped with the structure of this invention, the two may be very readily connected. The trailer is provided with suitable means for lifting the front end to such a height that the spindle 8 can be lined up with the socket. It is possible, by turning the crank 20, to elevate the rear end of the gooseneck until the spindle 8 and socket 7 are in alignment. It may be needful to have the fifth wheel free for swinging motion so that the gooseneck can be swung horizontally to get the spindle into alignment with the socket. It is clear that the locking cams 32, even when turned completely out of locking position, will not permit any great amount of lateral swinging of the gooseneck but still enough swinging is permitted to enable connection of the truck to the trailer, as described above.

Figure 5:
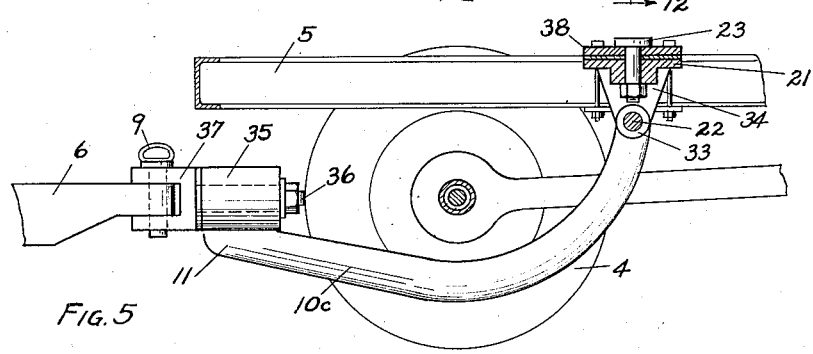

In the structure shown in Figs. 4 and 5, the gooseneck is denoted by 10c and is shown in the form of a loop closed at both ends. At its forward end, this gooseneck is provided with an eye or sleeve 33 which fits between ears 34 projecting downwardly from the underside of the fifth wheel. A bolt or pin 22 passes through the ears and sleeve and secures them together. Any suitable securing means may be used for securing the bolt or pin in place, such as a nut or cotter key.

At its opposite end, the gooseneck 10c is provided with an eye 35 for the reception of a spindle 36 which is secured in place by any suitable means, shown in the drawings as a nut. This connection permits relative lateral oscillation between the traction unit and the trailer, due to inequalities in the surface over which the structure is being transported. The spindle 36 is provided with a slotted head 37 designed to receive the forward end of the trailer tongue 6 and be secured thereto by the connecting pin or bolt 9.

In the structure of Figs. 6 and 7, the gooseneck is indicated by the numeral 10d and is shown as arching over the rear axle of the drawing vehicle and as being connected to the frame 5 of the traction unit in the same manner as shown in Figs. 4 and 5. The fifth wheel 21 is connected by the bolt 23 to the cross-plate 38, extending across the frame 5 and being bolted thereto, as shown in Fig. 12. At its rear end, the gooseneck 10d is forked, as shown at 39 in Fig. 6. The arms 39 of this fork have recesses for the reception of the cross member 40 which is held in place by pins 9 and which is apertured for the reception of the spindle 36, provided for the lateral relative oscillation of the traction unit and the trailer, as heretofore referred to.

The structure of Figs. 8 and 9 is very similar to that of Figs. 4 and 5, except as to the shape and position of the gooseneck 10e which passes over the axle, instead of under it, and is integral with the top side of the sleeve 35a, instead of the bottom, as in Figs. 4 and 5.

Figure 11:
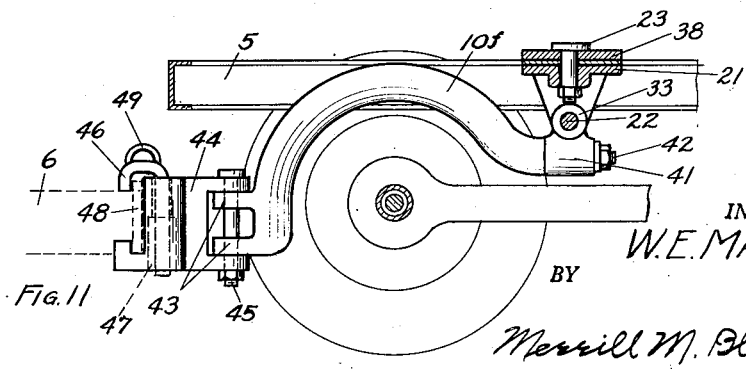

In the structure of Figs. 10 and 11, the gooseneck 10f has a spindle 42 at its forward end which passes through a sleeve 41 formed integral with the sleeve 33, the two sleeves having their axes at right angles so that there may be both vertical and transverse oscillation. Oscillation in the third plane is provided by the fifth wheel 21, plate 38, and bolt 23. At its opposite end, the gooseneck 10f has a fork 43 which has pivotal connection with a head 44 by reason of the bolt 45 which passes through these parts and pivotally connects them. A pair of spring-actuated hooks 46 are pulled downwardly by springs located in the openings 47 in the heads 44, and these hooks engage a head 48 on the front end of the tongue or reach 6 of the trailer. When it is desired to disconnect the trailer from the traction unit, this can be done by lifting up on the loops 49 constituting a part of the hooks 46. This structure provides two places for horizontal oscillation, as in Figs. 1, 5, and 9. It is thought desirable to add a locking mechanism, similar to that shown at 24 to 32 in Fig. 1, so that, when it is not desirable to have the gooseneck 10f swing about the pivot 23, it can be secured against such movement, the pivot 45 being relied upon, normally, to provide the necessary horizontal oscillation. This would be needed in the structures of Figs. 1, 5, 9 and 11.

The structure of Figs. 13 and 14 is similar in most ways to that of Figs. 8 and 9. However, the spindle 36 has a head 37a, the upper part of which extends farther back than the lower part and has a slotted post 50 within which one end of the lever 51 is pivoted. A latching pin 52 is actuated by the lever 51 and extends through the upper arm of the head 37a and into an opening in the tongue 6 to prevent relative lateral swinging between this and the gooseneck. A spring 53, attached to the lever 51 and the head 37a, tends to hold the pin 52 in latching position.

In this specification and the appended claims, the term drawbar is used as referring to the tongue or reach 6 and the gooseneck 10 in any one of its various forms shown.

It is of course understood that the specific destription of structure set forth above may be departed from without departing from the spirit of this invention as set forth in this specification and the appended claims.

Having now described my invention, I claim:

1. A structure for the purpose indicated comprising a socket member for fixed attachment to a trailer unit, a fifth wheel for attachment to a truck, a connecting unit for connecting the socket to the fifth wheel, said connecting unit being unitary at one end and divided at its other end, and a spindle connected to the unitary end of said connecting unit, said spindle being readily connectible to and disconnectible from the socket, the ends of the divided end of the connecting unit being connected pivotally to said fifth wheel.

2. A connection for the purpose described comprising a plate for connection to the under side of a truck floor, said plate having laterally spaced connecting members for the attachment of a gooseneck, and a gooseneck of roughly wishbone shape having its pair of ends connected to said spaced connecting members and its other end pivotally connected to a trailer unit.

3. A structure for the purpose indicated comprising an elongated connecting member of generally wishbone formation, provided at its closed end with a pivoted spindle, and at its open end with separate connecting means to be connected to a traction unit, in combination with means, for pivotal connection to said traction unit, to which said separate connecting means are connected, said structure having means for securing against pivotal motion the means to which said separate connecting means are connected, and means for raising the closed end of the connecting member.

4. A structure for the purpose indicated comprising an elongated connecting member of generally wishbone formation, provided at its closed end with a spindle, and at its open end with separate connecting means to be connected to a traction unit, in combination with means, for pivotal connection to said traction unit, to which said separate connecting means are connected, the defined structure having means for securing against pivotal motion the means to which said separate connecting means are connected, and operating means at the side of the traction unit whereby the securing means may be made operative or inoperative for the holding against pivotal motion of the pivotally connected means.

5. In a structure for the purpose stated, a cross-member for attachment to the frame of a traction unit, a drawbar pivotally attached to such cross-member for vertical and horizontal pivotal action, securing means for preventing, when desired, such horizontal pivotal motion, and attaching means for connecting a trailer unit to the rear end of said drawbar, the traction unit and the drawn unit being pivotally connected for relative lateral oscillation whereby to permit such relative motion without twisting strain due to such oscillation.

6. In a structure for the purpose stated, a cross-member for attachment to the frame of a traction unit, a gooseneck pivotally attached to such cross-member for vertical and horizontal pivotal motion, securing means for preventing, when desired, such horizontal pivotal motion, and attaching means for connecting a trailer unit to the rear end of said gooseneck, the traction unit and the drawn unit being pivotally connected for relative lateral oscillation whereby to permit such relative motion without twisting strain due to such oscillation, the gooseneck passing downwardly and rearwardly from its attachment to the traction unit frame, under the axle of the traction unit to the connection with the trailer unit.

7. In a structure for the purpose stated, a cross-member for attachment to the frame of a traction unit, a gooseneck pivotally attached to such cross-member for vertical and horizontal pivotal motion, securing means for preventing, when desired, such horizontal pivotal motion, and attaching means for connecting a trailer unit to the rear end of said gooseneck, the traction unit and the drawn unit being pivotally connected for relative lateral oscillation whereby to permit such relative motion without twisting strain due to such oscillation, the gooseneck passing rearwardly from its attachment to the traction unit frame over the axle of the traction unit to the connection with the trailer unit.

8. In a structure for connecting a traction unit to a drawn unit, means fixedly connected to the traction unit, a gooseneck, pivot means between the first means and the gooseneck enabling the gooseneck to swing vertically and horizontally with relation to the traction unit, securing means cooperating with the gooseneck for preventing, when desired, horizontal pivotal motion of the gooseneck, attaching means for connecting a drawn unit to the rear end of said gooseneck, and a longitudinally extending pivotal connection between the traction unit and the drawn unit for eliminating torsional strain between them due to transverse oscillation of one relatively to the other, the gooseneck passing downwardly and rearwardly from its attachment to the traction unit, under the axle of the traction unit to the connection with the drawn unit.

9. In a structure for the purpose stated, a cross-member for attachment to a traction unit, a plate cooperating with said cross-member and forming with it a fifth wheel, a drawbar pivotally connected to said plate for vertical and horizontal pivotal action, latching means cooperating with said plate for preventing, when desired, such horizontal pivotal motion, and attaching means for connecting a drawn unit to the rear end of said drawbar, the traction unit and the drawn unit being pivotally connected for relative lateral oscillation whereby to permit such relative motion without torsional strain due to such oscillation.

WILLIAM E. MARTIN.

REFERENCES CITED

The following references are of record in the file of this patent:

UNITED STATES PATENTS

| Number | Name | Date |
|---|---|---|
| 1,179,793 | Barber | Apr. 18, 1916 |
| 1,379,399 | Ferguson | May 24, 1921 |
| 1,473,563 | Julson | Nov. 6, 1923 |
| 1,524,504 | Bennett et al. | Jan. 27, 1925 |
| 1,608,660 | Nabors | Nov. 30, 1926 |
| 1,713,332 | Davis | May 14, 1929 |
| 1,920,878 | Odegard | Aug. 1, 1933 |
| 1,967,326 | Raney et al. | July 24, 1934 |
| 2,091,009 | Osman | Aug. 24, 1937 |
| 2,092,309 | Greer et al. | Sept. 7, 1937 |
| 2,133,065 | Weber | Oct. 11, 1938 |
| 2,266,913 | Simmons | Dec. 23, 1941 |
| 2,375,970 | Williams | May 15, 1945 |
| 2,383,666 | Martin | Aug. 28, 1945 |
| 2,392,903 | Currie | Jan. 15, 1946 |